Jan. 31, 1950 G. T. ROYDEN 2,495,776

FREQUENCY MODULATED TRANSMISSION SYSTEM

Filed April 23, 1945

INVENTOR.
GEORGE T. ROYDEN
BY
Robert Harding Jr.
ATTORNEY

Patented Jan. 31, 1950

2,495,776

UNITED STATES PATENT OFFICE 2,495,776

FREQUENCY-MODULATED TRANSMISSION SYSTEM

George T. Royden, South Orange, N. J., assignor to Federal Telephone and Radio Corporation, New York, N. Y., a corporation of Delaware Application April 23, 1945, Serial No. 589,875

10 Claims. (Cl. 332—19)

This invention relates to means for developing a frequency modulated radio frequency current with substantially constant integrated median frequency.

The principal object of the invention is to provide a relatively simple and at the same time reliable apparatus which will not only develop a frequency modulated radio frequency current, but will maintain the integrated median frequency between two predetermined closely set limits, thereby preventing any appreciable departure of the median frequency from a predetermined value for which the apparatus is set.

With this principal object in view and some others which will be apparent to those skilled in the art from the description hereinafter, an apparatus embodying the invention comprises the combination, with means for generating a radio frequency current, and audio frequency means for modulating said radio frequency current, of one crystal controlled means responsive to a rise in average frequency, of another crystal controlled means responsive to a fall of average frequency, means for differentially combining the integrated response to a rise in frequency with the integrated response to a fall in frequency, and using said means to control the frequency of the first mentioned generator.

My invention is particularly useful when a large frequency deviation is desired, since the device operates so that the integrated median frequency is maintained so nearly constant as to satisfy fully the requirements of the art.

The invention will be described more in detail in connection with one embodiment of the invention illustrated diagrammatically in the accompanying drawings, in which Fig. 1 is a diagrammatic view of an apparatus for developing an audio frequency modulated radio frequency modulated radio frequency current, controlled by two crystal control means.

Figure 1:
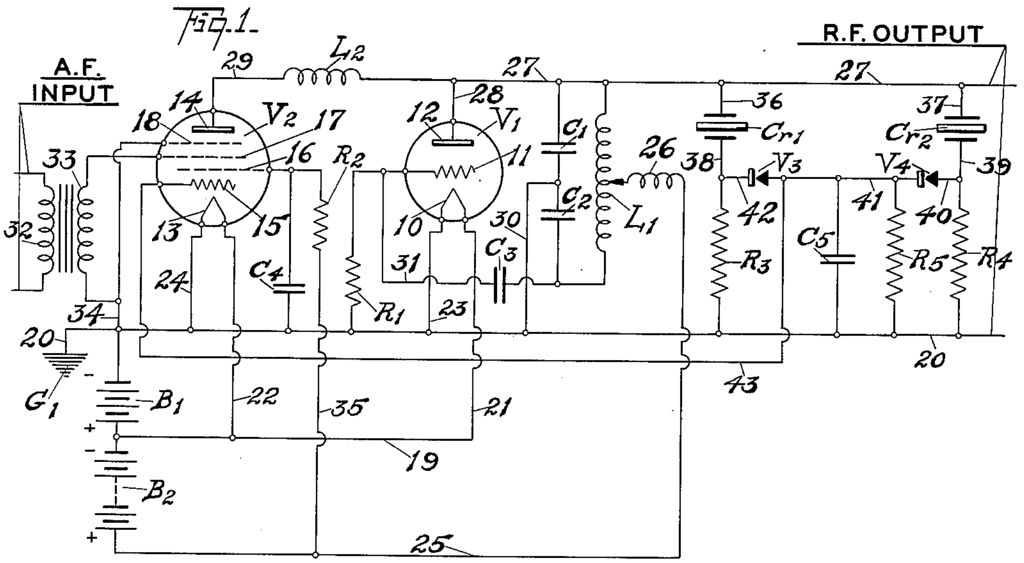

Referring to Fig. 1, $V_1$ is an oscillator vacuum tube, in this case shown as a triode having a cathode 10, a control grid 11 and an anode, or plate 12. In the example shown the cathode is indicated as an ordinary filament, it being understood, of course, that a heater type of cathode may be employed.

At $V_2$ is indicated a reactance modulator vacuum tube, shown as having a cathode 13, arranged to be heated in a suitable way, an anode or plate 14 and four grids, indicated at 15, 16, 17 and 18, respectively. The cathode 13 may be of any suitable type, but in the present case is indicated as of the usual heated filament type.

In the present embodiment of the invention the cathodes 10 and 13 of tubes $V_1$ and $V_2$, being of the heated filament type, are readily heated by any suitable source of direct current, as for example a battery $B_1$ having its positive terminal connected to a positive bus-conductor 19 and its negative terminal connected to a negative bus-conductor 20, which is suitably grounded, as by connection to ground $G_1$. Each of the filaments, 10 and 13, has one terminal connected to the positive bus-conductor 19, as for example by conductors 21 and 22, respectively, and also has its other terminal connected to the negative bus-conductor 20, as for example by conductors 23 and 24.

It will be understood by those skilled in the art that the parallel circuits for heating the filaments will be dimensioned or adjusted independently to provide for the proper required flow of current to each filament.

Each of the tubes $V_1$, $V_2$ is provided with plate current by suitable means. In the present embodiment of the invention a common source of plate current, such as a battery, indicated at $B_2$, is provided. The positive pole of this battery is conductively connected to plate 12 of tube $V_1$ over a conductor 25, radio frequency choke coil 26, part of an inductor $L_1$, and conductors 27 and 28.

The plate 14 of tube $V_2$ is connected to conductor 27, by a conductor 29, in which is included an inductor $L_2$. The source of plate current, in this case the battery $B_2$, has its negative terminal connected to the bus-conductor 19 of battery $B_1$, thereby completing the plate circuit of each tube.

A tank-circuit, which may be arranged or adjusted to be resonant at a predetermined frequency, is provided in connection with the plate circuit of the tube $V_1$ and between it and the grounded negative bus-conductor 20 of battery $B_1$. This tank-circuit comprises the inductor $L_1$ and two capacitors $C_1$, $C_2$ connected in series with each other and both in shunt to the inductor $L_1$. At the intermediate point between the capacitors there is connected a conductor 30, leading to the grounded negative bus-conductor 20 of battery $B_1$.

The grid 11 of the tube $V_1$ is arranged to be energized from the tank-circuit over a conductor 31 including a coupling capacitor $C_3$. The grid 11 is grounded through a resistor $R_1$, serving as a grid leak, connected between the grid and the grounded negative bus-conductor 20.

The internal impedance of tube $V_2$ plus the impedance of inductor $L_2$ is in shunt with the impedance of capacitor $C_1$ and therefore the effective reactance of the oscillation tank circuit will depend upon the voltage applied to the control grids of tube $V_2$. For instance, if one of the control grids is made more negative, the tube impedance rises, the positive reactance contributed by the circuit through $L_2$ to the tank circuit decreases, and the frequency of oscillation will rise.

The reactance modulator tube $V_2$ has one of its grids, for example, grid 17, arranged to be energized by a modulating frequency, as, for example, through a transformer, having a primary 32, arranged to be included in an audio frequency circuit, and a secondary 33 in series with the grid 17. The secondary 33 and the grid 18 of the tube $V_2$ have a common ground conductor 34 leading to the grounded negative bus-conductor 20 of battery $B_1$.

Another grid of the tube $V_2$, for example grid 16, is connected to the positive pole of battery $B_2$ over a conductor 35 including a resistor $R_2$, and also is connected to one terminal of a capacitor $C_4$ whose other terminal is grounded on the negative bus-conductor 20 of battery $B_1$.

The conductor 27 of the plate circuit of tube $V_1$ and the negative bus-conductor 20 of battery $B_1$ are extended to constitute the modulated radio frequency output, as indicated in Fig. 1, and between these extensions of said conductors a control network is provided, this comprising two crystal control devices, indicated at $Cr_1$, $Cr_2$, respectively, connected by conductors 36 and 37 to conductor 27 and by conductors 38 and 39 and resistors $R_3$, $R_4$ to the grounded negative bus-conductor 20. The conductors 38 and 39 are connected by conductors 40, 41 and 42 and two rectifiers $V_3$, $V_4$, the conductor 41 between the two rectifiers being connected to the grounded negative bus-conductor 20 over a capacitor $C_5$ and also over a resistor $R_5$ in shunt to the capacitor $C_5$.

The main control grid 15 of the reactance tube $V_2$ is arranged to be energized from a point on the intermediate conductor 41 between the rectifier $V_3$ and the point of connection of the capacitor $C_5$, as, for example, over a conductor 43.

The crystal control device $Cr_1$ is so dimensioned and constructed as to have a resonant frequency $f_1$ below the lower limit of the predetermined oscillation frequency while the crystal control device $Cr_2$ is so dimensioned and constructed as to have a resonant frequency $f_2$ which will be above the upper limit of the said oscillation frequency.

The rectifier $V_3$ is so connected to capacitor $C_5$ as to charge the latter negatively with respect to ground, the charging current being proportional to the voltage across resistor $R_3$. The rectifier $V_4$ is connected to capacitor $C_5$ so as to charge it positively, the charging current being proportional to the voltage across the resistor $R_4$.

The resistance of resistor $R_3$ should be chosen so that it is high with respect to the impedance of crystal $Cr_1$ at its resonant frequency but low with respect to the reactance of crystal $Cr_1$ at the average frequency of oscillation. The resistance of resistor $R_4$ should be similarly chosen with respect to the characteristics of crystal $Cr_2$. Capacitor $C_5$, should be so large that the change in its voltage during the lowest practical audio frequency cycle will be negligible. Resistor $R_5$ may be omitted, since there is a path to ground through rectifier $V_3$ and resistor $R_3$ or rectifier $V_4$ and resistor $R_4$, or if used its resistance (in ohms) should be so high that the product of it with the capacitance of $C_5$ (in farads) will be quite large with respect to the time of one cycle (in seconds) of the lowest audio frequency.

The action of the apparatus, so far as concerns the production of audio frequency modulated radio frequency oscillating currents, is similar to the usual combination of an oscillator tube and a reactance tube having a grid controlled by the usual audio frequency circuit.

In the present invention the control of reactance tube $V_2$ by the voltage connection, such as conductor 43, to the network containing two crystal control devices, two rectifiers, capacitor $C_5$ and the resistors $R_3$, $R_4$ and $R_5$, arranged and constructed as hereinbefore set forth, results in a special control action of the oscillator, which will now be explained.

In a circuit system adjusted so that the circuit, including crystal control devices $Cr_1$, $Cr_2$, resistors $R_3$ and $R_4$, rectifiers $V_3$, $V_4$, and capacitor $C_5$, is symmetrical, that is, to say balanced, an oscillation frequency supplied from the plate circuit of the oscillator tube $V_1$ at a frequency midway between the resonant frequencies $f_1$ and $f_2$ of the crystals in the respective crystal control devices $Cr_1$ and $Cr_2$ will result in equal current being rectified in the rectifiers $V_3$ and $V_4$, wherefore there will be no net charge in capacitor $C_5$. When the oscillation frequency in the plate circuit of the oscillator tube $V_1$ rises above the above-mentioned mid-frequency, the reactance of the crystal of the crystal control device $Cr_2$ decreases, the radio frequency current through it increases, the voltage across resistor $R_4$ increases and positive charging current to capacitor $C_5$ increases. At the same time the reactance of the crystal in the crystal control device $Cr_1$ increases, resulting in a decrease of the negative charging current to capacitor $C_5$. When the oscillation frequency of the current in the plate circuit of the oscillator tube $V_1$ drops below the mid-frequency the actions which take place in the control network are the opposite of those just described.

When an audio frequency signal is applied through input transformer 33 to grid 17 of the reactance modulator tube, the frequency of oscillation will vary above and below the mid-frequency. When the oscillation frequency (as modulated) is above the mid-frequency, the positive charges in capacitor $C_5$ will exceed the negative charges and, when the oscillation frequency is below the mid-frequency, the negative charges will exceed the positive charges.

It is to be noted that because of the integrating effect of positive and negative charges in capacitor $C_5$, its potential, except for a negligible ripple, will remain substantially constant so long as the average oscillation frequency is midway between the resonant frequencies of the two crystals of the crystal control devices $Cr_1$, $Cr_2$. But, if the oscillator $V_1$ should tend to drift, there will be difference between the integrated positive and negative charges in the capacitor $C_5$, which results in a current flow through the resistor $R_5$ and the application to the control grid 15 of the reactance modulator tube $V_2$, of a correction voltage, thereby correcting the tendency to drift.

For instance, if the frequency should tend to drift downwards the current rectified by rectifier $V_3$ will exceed that rectified by rectifier $V_4$, the voltage of capacitor $C_5$ will become more negative, and the more negative voltage applied over conductor 43 to control grid 15 will increase the impedance of reactance tube $V_2$ thereby raising the frequency of oscillation enough to correct for the downward drift.

From the above it will be understood that the oscillator frequency will be continuously monitored and the actual integrated median frequency automatically corrected to bring it to that of the predetermined mid-frequency of the crystal resonant frequencies.

Figure 2:
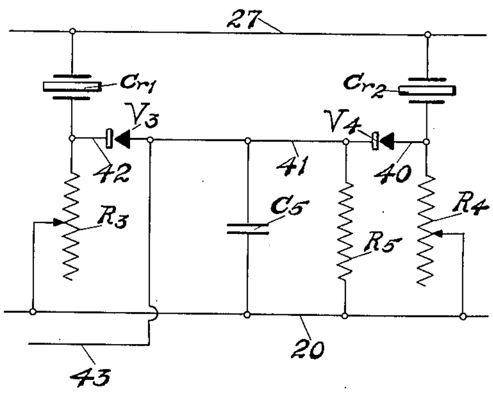
Fig. 2 is a diagrammatic view illustrating one modification of the system.
Figure 3:
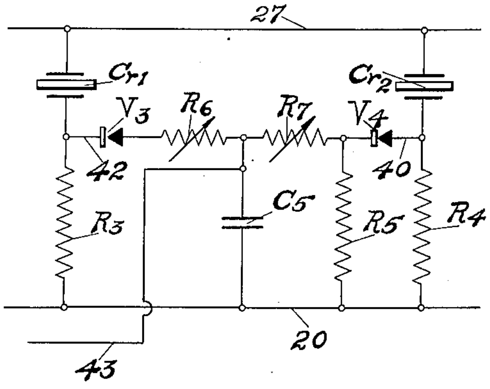
Fig. 3 is a similar view illustrating another modification of the system, both being hereinafter referred to and explained.

In the best embodiment of the invention one or the other or both of the resistors $R_3$ and $R_4$ may be made adjustable, as indicated in Fig. 2, so that the apparatus may be adjusted to shift the integrated median frequency to any desired relation with resonant frequencies $f_1$, $f_2$ of the two crystals. The same result may be achieved by inserting a variable resistor in series with either rectifier $V_3$ or $V_4$ or both. This modification is indicated diagrammatically in Fig. 3 wherein a variable resistor for the rectifier $V_3$ is indicated at $R_6$ and a variable resistor for the rectifier $V_4$ is indicated at $R_7$.

Since crystal control devices may be designed to maintain a high degree of frequency stability for long periods of time and over wide ranges of temperature, it becomes possible to provide in the apparatus embodying the present invention an oscillator whose frequency may be modulated with large deviations yet accurately maintain the average median frequency extremely close to the desired mid-frequency.

What is claimed is:

1. A frequency modulation system comprising an oscillator, a reactance connected across the tank circuit of said oscillator, means to vary said reactance in accordance with a signal to be transmitted, whereby the oscillations of said oscillator are frequency modulated, a pair of crystals each connected in a separate network across common points of said oscillator tank circuit, one of said crystals being resonant at a frequency below the desired median frequency of said oscillator and the other of said crystals being resonant at a frequency above the said desired median frequency, a condenser, means to tend to charge said condenser in one polarity when current flows through one of said crystals, means to tend to charge said condenser in the opposite polarity when current flows through said other crystal, and means to utilize the voltage across said condenser to vary said reactance so as to hold the median frequency of the oscillations produced by said oscillator to a predetermined desired median frequency and output means for said frequency modulated oscillations connected across said points.

2. A frequency modulation system in accordance with claim 1 in which one of the crystals is tuned to a frequency below the lower limit of the frequency swing caused by the modulation and the other crystal is tuned to a frequency above the upper limit of said frequency swing.

3. A frequency modulation system in accordance with claim 1 in which each of said networks comprises a resistance in series with a respective crystal, said condenser is connected across one of said resistances in series with a first rectifier arranged to charge the condenser in one polarity when the current flows through said resistance and across the other resistance in series with a second rectifier arranged to charge the condenser in the other polarity when the current flows through said other resistance.

4. A frequency modulation system according to claim 1 in which the means to control the adjustment of said reactance by the voltage across said condenser includes a time constant circuit to maintain said voltage substantially constant for variation of said oscillator frequency caused by said modulating means.

5. A frequency modulation system comprising an oscillator, a reactance connected across said oscillator so as to vary the frequency thereof by variations of said reactance, means to vary said reactance in accordance with a signal to be transmitted, a pair of crystals each connected in a separate network across common points of said oscillator, one of said crystals being tuned to a frequency below the desired median frequency of said oscillator and the other of said crystals being tuned to a frequency above said median frequency, a condenser, two rectifiers for changing said condenser, one of said rectifiers being so polarized that said condenser will tend to be charged in one polarity when current flows through one crystal and in the opposite polarity when current flows through the other crystal, and means to adjust the mean value of said reactance in accordance with the amount and polarity of the charge across said condenser and output means for said frequency modulated oscillations connected across said points.

6. A frequency modulating system according to claim 5 in which a time constant is provided in the means to adjust the mean value of the reactance which is sufficient to prevent fluctuations of said reactance caused by variations of the oscillator frequency under the influence of the modulating signal.

7. A frequency modulating system according to claim 5 in which the reactance comprises a multigrid thermionic tube the signal being applied to one grid and the voltage across the condenser to another grid.

8. In an apparatus for the production of frequency-modulated oscillatory currents, the combination, with an oscillator vacuum tube, a reactance modulator vacuum tube, means for impressing a modulating voltage on a grid of the reactance tube, connections whereby the reactance tube controls the frequency of the oscillations of the oscillator tube, and means for energizing the said tubes, of a plate circuit energized by the oscillator tube, a control network bridging said plate circuit, said control network including two crystal control devices having crystals whose resonant frequencies are one greater and the other less than the predetermined mid-frequency of the oscillator tube, separate resistors in series with the respective crystal control devices, and connected across common points of said plate circuit, a capacitor, two rectifiers, each arranged to rectify the output current from the corresponding crystal device and connected to charge the capacitor in opposition to each other, and means for impressing on a grid of the reactance tube a voltage which is a function of the charging voltage on the capacitor and output means for said frequency modulated oscillations connected across said common points.

9. A frequency modulation system comprising a signal source, an oscillator circuit including a tank circuit resonant at a given frequency, a reactance modulator circuit coupled across said tank circuit for controlling the frequency of oscillation of said oscillator circuit in accordance with signals from said source, a pair of series circuits each comprising a crystal coupled to a common point on said tank circuit and a resistance coupled to a different common point on said tank circuit, one of said crystals being resonant above and the other crystal resonant below said given frequency, means for separately rectifying the voltage developed across the resistances due to oscillation current flow through said crystals, means for applying said rectified voltages differentially to a storage circuit, and means for applying the voltage developed across said storage circuit to said reactance modulator to control the frequency of oscillation of said oscillator circuit.

10. An arrangement according to claim 9, wherein said storage circuit is non-responsive to signal modulations of said oscillator circuit.

GEORGE T. ROYDEN.

REFERENCES CITED

The following references are of record in the file of this patent:

UNITED STATES PATENTS

| Number | Name | Date |
|---|---|---|
| 2,296,919 | Goldstine | Sept. 29, 1942 |
| 2,312,070 | Bliss | Feb. 23, 1943 |
| 2,374,735 | Crosby | May 1, 1945 |

OTHER REFERENCES

Q S T, page 48, June 1940.
Q S T, page 49, June 1940.